(12) United States Patent
Wiercinski

(10) Patent No.: US 11,072,716 B2
(45) Date of Patent: Jul. 27, 2021

(54) SAG RESISTANT VAPOR PERMEABLE BARRIER COATING APPLICABLE AT LOW TEMPERATURE

(71) Applicant: GCP Applied Technologies Inc., Cambridge, MA (US)

(72) Inventor: Robert A. Wiercinski, Lincoln, MA (US)

(73) Assignee: GCP Applied Technologies Inc., Cambridge, MA (US)

(*) Notice: Subject to any disclaimer, the term of this patent is extended or adjusted under 35 U.S.C. 154(b) by 296 days.

(21) Appl. No.: 15/504,104

(22) PCT Filed: Aug. 12, 2015

(86) PCT No.: PCT/US2015/044759
§ 371 (c)(1),
(2) Date: Feb. 15, 2017

(87) PCT Pub. No.: WO2016/028556
PCT Pub. Date: Feb. 25, 2016

(65) Prior Publication Data
US 2017/0240763 A1 Aug. 24, 2017

Related U.S. Application Data

(60) Provisional application No. 62/038,442, filed on Aug. 18, 2014.

(51) Int. Cl.
| | |
|---|---|
| *C09D 5/02* | (2006.01) |
| *C09D 7/45* | (2018.01) |
| *C09D 133/06* | (2006.01) |
| *C09D 7/61* | (2018.01) |
| *C09D 7/20* | (2018.01) |
| *C09D 7/43* | (2018.01) |
| *B05D 3/00* | (2006.01) |
| *C09D 5/18* | (2006.01) |
| *E04B 1/66* | (2006.01) |
| *C08K 3/34* | (2006.01) |

(52) U.S. Cl.
CPC .............. *C09D 7/45* (2018.01); *B05D 3/007* (2013.01); *C09D 5/024* (2013.01); *C09D 5/18* (2013.01); *C09D 7/20* (2018.01); *C09D 7/43* (2018.01); *C09D 7/61* (2018.01); *C09D 133/06* (2013.01); *C09D 133/062* (2013.01); *E04B 1/66* (2013.01); *C08K 3/346* (2013.01); *C08L 2201/02* (2013.01)

(58) Field of Classification Search
CPC ........ C09D 133/62; C09D 5/18; C09D 5/024; C09D 7/002; C09D 7/1216; C09D 7/001; C08L 2201/02; C08K 3/346
USPC ....................................................... 523/122
See application file for complete search history.

(56) References Cited

U.S. PATENT DOCUMENTS

| | | | | |
|---|---|---|---|---|
| 6,020,407 A | * | 2/2000 | Campbell ................ | C09D 7/43 524/156 |
| 7,652,087 B2 | * | 1/2010 | Dimanshteyn ........... | C09D 5/18 524/430 |
| 8,172,938 B2 | * | 5/2012 | Alright ................... | C04B 26/02 106/672 |
| 8,524,822 B2 | | 9/2013 | Wiercinski et al. | |
| 8,748,528 B2 | | 6/2014 | Cao et al. | |
| 10,487,218 B2 | * | 11/2019 | Couturier ................ | C09D 5/18 |
| 2003/0229171 A1 | | 12/2003 | Zhao et al. | |
| 2005/0124240 A1 | | 6/2005 | Porter | |
| 2006/0155031 A1 | | 7/2006 | Wiercinski | |
| 2009/0004468 A1 | | 1/2009 | Chen et al. | |
| 2010/0210745 A1 | | 8/2010 | McDaniel | |
| 2012/0094138 A1 | * | 4/2012 | Bilodeau .............. | C09D 167/08 428/532 |
| 2012/0231170 A1 | | 9/2012 | Cao et al. | |
| 2014/0196396 A1 | * | 7/2014 | Watts ...................... | C09D 7/61 52/408 |

FOREIGN PATENT DOCUMENTS

| | | | | |
|---|---|---|---|---|
| DE | 19620149 | 11/1997 | | |
| EP | 1344875 | 3/2003 | | |
| WO | WO 2006/056644 A1 | * 6/2006 | ............... | C09D 7/14 |

OTHER PUBLICATIONS

Young, Form PCT/ISA/210, International Search Report, PCT Application No. PCT/US2015/004759, dated Nov. 9, 2015, 2 pages.
Young, Form PCT/ISA/237, Written Opinion of the International Searching Authority, PCT Application No. PCT/US2015/004759, dated Nov. 9, 2015, 6 pages.

* cited by examiner

*Primary Examiner* — Jane L Stanley
(74) *Attorney, Agent, or Firm* — Craig K. Leon

(57) ABSTRACT

Methods and systems of the invention, for achieving a liquid-applicable, aqueous-based coating composition that forms a water-impermeable, vapor permeable barrier coating when applied onto a construction surface and allowed to dry, involve mixing together separate first and second components, wherein the first component comprises an acrylic emulsion, flame retardant, clay, and optionally at least one additive selected from thickeners (e.g., cellulosic), fillers, and other conventional additives; and wherein the second component comprises a freezing point depressing agent with a specific type of thickener selected from the group of associative thickeners, alkali soluble emulsion thickeners, or mixture thereof, to obtain the liquid-applicable coating. The present invention achieves low temperature film formation without reliance upon calcium nitrite, calcium nitrate, or sodium chloride type of freezing point depressing salts. The coating can be applied at low (e.g., sub-freezing) temperatures onto a construction surface such as wood, fiberboard, gypsum, cement, concrete, and other building substrates to achieve an effective barrier membrane.

20 Claims, No Drawings

SAG RESISTANT VAPOR PERMEABLE BARRIER COATING APPLICABLE AT LOW TEMPERATURE

FIELD OF THE INVENTION

The present invention relates to a vapor-permeable barrier coating applicable at low temperatures to a construction surface; and, more particularly, to a two-component method and system which involve mixing a first component having an acrylic emulsion and flame retardant with a second component comprising a certain freezing point depressing agent and certain thickener, to obtain a liquid composition which is then applied to the surface.

BACKGROUND OF THE INVENTION

It is known to apply liquid aqueous-based coatings at sub-freezing temperatures onto construction surfaces, such as wood, plywood, fiber or particle board, gypsum board, rigid insulation, cement, mortar concrete, brick, etc., to form an air barrier coating layer.

U.S. Pat. No. 8,748,528 of Cao et al., owned by the common assignee hereof, teaches liquid barrier coating compositions which employ a metal salt to lower freezing point and an evaporation-enhancing agent to quicken drying time and skin formation of the coating at low temperatures. The salt can be a water-soluble alkali or alkaline earth metal chlorides (e.g., sodium chloride), nitrates or nitrites (e.g., calcium nitrate or nitrite), and mixtures thereof. Ethanol was identified as a preferred evaporation-enhancing agent.

However, metal salts such as calcium nitrate are difficult to use as freezing point depressing agents in emulsions that are ion intolerant, or, in other words, in emulsions that coagulate due to high ion concentrations of dissolved salt. The present inventor has discovered that salt presence tends to reduce elongation of the dried coating which is necessary for bridging cracks, and that the combination of the salt with an ethanol evaporation-enhancing agent can hinder film formation as compared to using ethanol alone. Hence, a novel aqueous-based barrier composition and method are needed for low temperature, liquid applications of coatings onto construction surfaces.

SUMMARY OF THE INVENTION

In surmounting the disadvantages of the prior art, the present invention provides a liquid coating composition system and method, wherein coating composition is made by mixing two components at the job site before application onto a construction surface.

An exemplary embodiment of the present invention is a coating system which comprises a first component having a water-based, flame retardant, water vapor permeable air barrier coating composition, and a second component having a freezing point depressing agent and certain thickener comprising an associative thickener, alkali soluble emulsion thickener, or mixture thereof. These two components are mixed together prior to application, and the resultant coating composition may be applied in liquid form onto a construction surface at temperatures below the freezing point of water, for example, minus 3.9 degrees Celcius (−3.9° C.=25 degrees Fahrenheit) or lower temperature.

Another embodiment of the invention relates to a method for providing a liquid barrier coating on a construction surface, such as at low (e.g., sub-freezing) temperatures, wherein the first component and second component are delivered or transported separately (e.g., in separate containers or packages to the job site); mixed together at the jobsite; and thereafter applied in liquid form onto the construction surface at the jobsite.

An exemplary method of the invention for providing a liquid-applicable coating composition for creating a flame-retarding, water-vapor permeable air barrier membrane on a construction surface at low application temperatures, thus comprises: (A) mixing together a first component comprising a coating composition which is applicable as a water-based liquid and which provides a flame retardant, water-vapor permeable air barrier coating when dry, and a second component comprising a freezing point depressing agent, whereby a water-based liquid composition is obtained; said first component comprising (i) an emulsion of an acrylic polymer or copolymer having a glass transition temperature not higher than minus twenty degrees Celcius (−20° C.), (ii) a flame retardant, (iii) a dispersant, (iv) a pigment; (v) a swellable clay; and (vi) optionally at least one additive selected from thickener, filler, biocide, fungicide, antioxidant, UV absorber, or mixture thereof; and said second component comprising a (vii) freezing point depressing agent and (viii) a thickener selected from the group of associative thickeners, alkali soluble emulsion thickeners, or mixture thereof; and (B) applying onto a construction surface a coating of said water-based liquid composition obtained from mixing together said first and second components, and allowing said applied coating to dry, whereby a flame-retardant, water-vapor permeable air barrier membrane is provided.

An exemplary coating composition system of the invention thus comprises: a first component comprising (i) an emulsion of an acrylic polymer or copolymer having a glass transition temperature not higher than minus twenty degrees Celcius (−20° C.), (ii) a flame retardant, (iii) a dispersant, (iv) a pigment; (v) a swellable clay; and (vi) optionally at least one additive selected from thickener (e.g., modified cellulosic thickener or other type thickeners), filler (preferably inorganic), biocide, fungicide, antioxidant, UV absorber, or mixture thereof; and a second component comprising a (vii) freezing point depressing agent and (viii) a thickener selected from the group consisting of associative thickeners, alkali soluble emulsion thickeners, or mixture thereof.

Preferably, each of the first and second components are devoid or substantially devoid of alkali or alkaline earth metal salts selected from chlorides, nitrates, or nitrites (wherein "substantially devoid" means containing 0 to 0.25% by weight of total solids based on weight of aqueous composition). The present inventor discovered that omitting such salts and instead using an associative thickener and/or alkali soluble emulsion thickener in the second component (containing the freezing point depressing agent) improves film formation within the resultant coating at low temperatures.

In other embodiments, the first component may optionally employ a conventional thickener (e.g., modified cellulose) or a thickener which is the same as or similar to the associative thickener and/or alkali soluble emulsion thickener employed in the second component containing the freezing point depressing agent. Thus, in still further embodiments, both of the first and second components may employ the same thickener, although this is not necessary. Preferably, the total amount of associative thickener and/or alkali soluble emulsion thickener used in the second component containing the freezing point depressing agent (and optionally in the first component containing the acrylic emulsion) is 0.25% to 4.0% based on the weight of water in the coating.

Further advantages and features of the invention are described in detail hereinafter.

DETAILED DESCRIPTION OF PREFERRED EMBODIMENTS

Exemplary compositions and methods of the invention involve applying a liquid aqueous-based coating composition, using two components which are mixed together preferably at the job site just before application, onto a target construction surface. The construction target surface may be cementitious, such as cement, mortar, masonry, concrete, shotcrete, gypsum, gypsum board, gypsum sheathing, or combination of cement and gypsum; or the construction surface may comprise wood, plywood, oriented strand board, fiberboard, particle board, rigid insulation, or combinations of the foregoing.

The application of the liquid aqueous-based coating composition is preferably spray-applied (such as by using pressurized hose or pipe having spray nozzle), but may also include application by brush, trowel, sponge, mop, or other modes for applying liquid coatings.

As summarized above, the present invention provides methods and systems for providing a liquid-applicable coating composition for creating a flame-retarding, water-vapor permeable air barrier membrane on a construction surface at low application temperatures. The method, for example, comprises mixing together a first component comprising a coating composition which is applicable as a water-based liquid and which provides a flame retardant, water-vapor permeable air barrier coating when dry, and a second component comprising a freezing point depressing agent and certain thickener, whereby a water-based liquid composition is obtained for low temperature applications.

In exemplary embodiments, the first component comprises (i) an emulsion of an acrylic polymer or copolymer having a glass transition temperature not higher than minus twenty degrees Celcius (−20° C.), (ii) a flame retardant, (iii) a dispersant, (iv) a pigment; (v) a swellable clay; and (vi) optionally at least one additive (and more preferably at least two additives) selected from thickener (e.g., modified cellulosic thickener), filler, biocide, fungicide, antioxidant, UV absorber, or mixture thereof; while the second component comprises a (vii) freezing point depressing agent and (viii) a thickener selected from the group consisting of associative thickener, alkali soluble emulsion thickener, or mixture thereof. Preferably, the first component contains a modified-cellulose type thickener, and other additives such as biocides, fungicides, antioxidants, or UV absorbers which enhance qualities or properties of the product.

In the acrylic emulsion of the first component, the acrylic homopolymer or copolymer has a glass transition temperature of less than or equal to minus twenty degrees Celcius (−20° C.). This low glass transition temperature provides for good film forming capability at low temperature, such as less than −5° C. or lower, for example, without the need for a coalescing agent. The acrylic polymer may be a homopolymer or a copolymer of an acrylic ester and will have a repeating group represented by the structure represented by the structure —(CH$_2$—C(R$^1$)HCOOR)— wherein R represents an alkyl group and R$^1$ represents hydrogen or CH$_3$ group.

For example, the acrylic ester may be selected from the group consisting of ethyl acrylate, butyl acrylate, 2-ethyl-hexyl acrylate, isobutyl acrylate, octadecyl methacrylate, and octyl methacrylate. Homopolymers of these acrylic esters have glass transition temperatures of less than or equal to −20° C. Exemplary acrylic copolymers suitable for use in the invention may comprise an acrylic ester and a comonomer. Preferred acrylic comonomers include vinyl acetate and acrylonitrile. Vinyl acetate is most preferred. The ratio of acrylic ester plus vinyl acetate or acrylonitrile should be such that the glass transition temperature is equal to or less than −20° Celcius.

The copolymer may comprise other comonomers as well as long as the glass transition temperature of the copolymer is less than or equal to −20° C. The glass transition temperature for copolymers may be calculated by the Fox equation shown below (as provided for binary monomer combination):

$$\frac{1}{T_g} = \frac{w_1}{T_{g,1}} + \frac{w_2}{T_{g,2}}.$$

wherein $w_1$ and $w_2$ are weight fractions of monomers 1 and 2, respectively; while $T_{g,1}$ and $T_{g,2}$ are glass transition temperatures of the respective homopolymers.

Exemplary flame retardants contemplated for use in the present invention may be selected from minerals, organo halogen compounds, and organo phosphorus compounds. For example, mineral flame retardants may be selected from aluminium hydroxide (ATH), magnesium hydroxide (MDH), huntite, hydromagnesite, borates, or mixtures thereof.

Exemplary organohalogen compound contemplated for use as flame retardants may be selected from chlorinated paraffins; organobromines, such as decabromodiphenyl ether, decabromodiphenyl ethane; polymeric brominated compounds such as brominated polystyrenes, brominated carbonate oligomers, brominated epoxy oligomers, tetrabromophthalic anyhydride, tetrabromobisphenol A, hexabromocyclododecane, or mixtures thereof.

Exemplary organophosphorus compounds contemplated for use as flame retardants may be selected from organophosphates such as triphenyl phosphate, resorcinol bis(diphenylphosphate), bisphenol A diphenyl phosphate, and tricresyl phosphate; phosphonates such as dimethyl methylphosphonate; and phosphinates such as aluminum diethyl phosphinate. Another class of flame retardants contains both phosphorus and a halogen. Such compounds include tris(2, 3-dibromopropyl) phosphate (brominated tris) and chlorinated organophosphates such as tris(1,3-dichloro-2-propyl) phosphate (chlorinated tris or TDCPP), tetrakis(2-chlorethyl)dichloroisopentyldiphosphate, or mixtures thereof.

Among preferred flame retardants for use in the first component (containing the acrylic-emulsion) are alumina trihydrate, chlorinated paraffin, and mixtures thereof. Alumina trihydrate is most preferred.

The first component of the invention also comprises at least one dispersant for dispersing the flame retardant (particularly if it is a mineral) and inorganic fillers. There are two categories of polymeric dispersants which are most preferred: polyacid homopolymer and polyacid copolymer types. The polyacid copolymer category can be further broken into two subcategories: hydrophilic and hydrophobic copolymers. Polyacid homopolymers are made by polymerizing acrylic, methacrylic, crotonic, or maleic acids together. These homopolymers are supplied in the neutralized form using either ammonium or alkali metal salts. Hydrophilic copolymers are copolymers of one or more of the acids mentioned above and a hydrophilic comonomer. Hydrophobic copolymers are copolymers are one or more of the acids mentioned above and a hydrophobic comonomer. These copolymers are supplied in the neutralized form using either ammonium or alkali metal salts. Polyacid homopolymer and hydrophilic copolymer dispersants are preferred because these enhance vapor permeability of the barrier coating. There are several manufacturers of these commercially-available materials. For example, Dow Chemical sells a dispersant under the trade name TAMOL®. Such polyacid dispersants include TAMOL® 945, 1254, 851, 901, and 963. Hydrophilic copolymer dispersants include TAMOL® 1124. Hydrophilic copolymer dispersants are most preferred.

Exemplary first components of the present invention also comprise at least one pigment for opacity and weatherability in the coating (e.g., resistance to degradation from sunlight exposure). Preferred pigments include titanium dioxide and zinc oxide. Pigment may also be added to provide color to the membrane.

Exemplary first components of the present invention further comprise a swellable clay. The clay may be, for example, montmorrillonite, smectite, bentonite, or other swellable clay, and should provide a rheological advantage such as body to the coating. A swellable clay will also enhance water vapor permeability in the resultant coating, and it will also enhance flame retardancy. Such clays are commercially available. For example, American Colloid Company sells a suitable clay under the trade name POLARGEL® T. As another example, Southern Clay Products sells a mineral colloid under the trade name Mineral Colloid MO™.

The first component containing the acrylic emulsion may further include optional components, such as thickeners (e.g., cellulosic thickener or other convention thickener), as well as a filler, such as calcium carbonate talc, silica, and other additives used for enhancing polymer coating properties. A suitable thickener for the first component containing the acrylic emulsion may be selected from conventional rheological thickening agents, such as, without limitation, (a) biopolymer polysaccharides such as diutan gum, welan gum, xanthan, rhamsan, gellan, dextran, pullulan, curdlan, and derivatives thereof; (b) marine gums such as algin, agar, carrageenan, and derivatives thereof; (c) plant exudates such as locust bean, gum arabic, gum Karaya, tragacanth, Ghatti, and derivatives thereof; (d) seed gums such as guar, locust bean, okra, psyllium, mesquite, and derivatives thereof; (e) starch-based gums such as ethers, esters, and derivatives thereof; (f) associative thickeners such as hydrophobically modified alkali soluble emulsion thickeners (HASE), hydrophobically modified ethylene oxide-based urethane thickeners (HEUR), cellulosic ((e.g., whether modified or not), acrylates (e.g., hydrophobically modified alkali swellable copolymers); or (g) alkali soluble emulsion thickeners (ASE); or mixtures thereof.

Thus, the thickener used in the second component containing the freezing point depressing agent does not have to be the same as used in the first component containing the acrylic emulsion; and it may be preferable to use a cellulosic thickener in the first component (while HASE, HEUR, and/or ASE thickeners are used in the second component).

The first component may include, for example, the following ingredients in the following exemplary ranges (which are based on percentage of total dry weight of the first component):

| Acrylic (Emulsion) Polymer | 30-50% |
| Mineral or Mineral + Halogen Flame Retardant | 45-65% |
| Dispersant | 0.2-1% |
| Pigment | 1-5% |
| Clay (e.g., montmorillonite) | 0.5-3% |

In providing a two-component system, the present invention allows for application of a liquid coating composition at temperatures below the freezing point of water. However, if the temperature at time of application is above the freezing point and preferably above 40° F., the first component containing the acrylic emulsion can be applied alone without the second component (which contains the freezing point depressing agent), and this avoids any delay required by mixing together the first and second components. At temperatures below the freezing point of water and preferably below 40° F., the first and second components are preferably mixed together thoroughly at the job site just before being applied in liquid form to the construction surface.

For the second component containing at least one freezing point depressing agent, an exemplary freezing point depressing agent should preferably be a water-soluble volatile organic solvent. The solvent may be, for example, selected from the group consisting of methanol, ethanol, propanol, isopropanol, methyl ethyl ketone, and acetone. Of these, ethanol is most preferred, as it enhances the evaporation rate of water by forming an azeotrope with water which facilitates its evaporation.

In further exemplary embodiments of the invention, the amount of organic solvent used is such that its molality, based on the aqueous content of the first and second components when combined, is preferably 1.65 moles/kg to 13.7 moles/kg, more preferably 2.75 moles/kg to 8.2 moles/kg, and most preferably 2.75 moles/kg to 5.5 moles/kg (wherein moles/kg denotes moles per kilogram of water as solvent).

Depression of the freezing point by a minimum of 3° C. and a maximum of 25° C. is preferred. Depression of the freezing point by a minimum of 5° C. in a maximum of 15° C. is more preferred. Depression of the freezing point by a minimum of 5° C. and a maximum of 10° C. is most preferred. The freezing point depression is directly proportional to the molality of the solute (organic solvent) by the equation $$\Delta T_f = T_f(\text{solvent}) - T_f(\text{solution}) = K_f \times m$$

wherein $\Delta T_f$ represents the freezing point depression, $T_f$(solution) represents the freezing point of the solution, $T_f$(solvent) represents the freezing point of the solvent, $K_f$ represents the freezing point depression constant, and m represents the molality of the solute. Molality has the units of moles of solute, the organic solvent, per kilogram of water in the mixture of the first component (containing acrylic emulsion) and second component (containing freezing point depressing agent). The water in the mixture of the first and second components includes added water, water in the emulsion, and water contained in some of the additives. $K_f$ for water is 1.86° C.*Kg/mol. This equation provides for a reasonable estimate of freezing point depression at low concentrations. To achieve a freezing point depression of 3° C. and 25° C., the preferred molar amounts are 1.65 moles per kilogram and 13.7 moles per kilogram, respectively. Therefore, the preferred molar amount range for the water-soluble organic solvent in the aqueous phase of the mixture of the first and second components is 1.65 moles per kilogram to 13.7 moles per kilogram. The more preferred molar amount of the water-soluble organic solvent in the aqueous phase of the mixture of components A and B is 2.75 moles per kilogram to 8.2 moles per kilogram for achieving a freezing point depression of 5° C. and 15° C., respectively. The most preferred molar amount ranges for the water-soluble organic solvent in the aqueous phase of the mixture of first and second components is 2.75 moles per kilogram to 5.5 moles per kilogram for a 5° C. and 10° C., respectively, freezing point depression.

The present inventor was especially surprised by the discovery that addition of organic solvent in an amount sufficient to depress the freezing point of water by 3° C. or more caused a significant drop in the viscosity of the coating, such that the coating composition was susceptible when applied as a liquid in a single application to substantial sagging. To compensate for this phenomenon, the present inventor includes an associative or alkali soluble emulsion type thickener with the freezing point depressing agent in the second component, which is added at the jobsite prior to application.

As mentioned in the summary of the invention, it is preferred that each of the first and second components are entirely or substantially devoid of alkali or alkaline earth metal salts selected from chlorides (e.g., sodium chloride), nitrates (e.g., calcium nitrate), or nitrites (e.g., calcium nitrite, wherein "substantially devoid" is quantitatively defined herein as 0-0.25% by weight total solids. The present inventor discovered that omitting such salts and using instead the associative thickener and/or alkali soluble emulsion thickener in the second component having the freezing point depressing agent (e.g., organic solvent) improves the film formation of the resultant coating composition particularly at low temperatures.

The thickener used in the second component containing the freezing point depressing agent should be selected from (i) associative thickeners such as hydrophobically modified alkali soluble emulsion thickeners (HASE) or hydrophobically modified ethylene oxide-based urethane thickeners (HEUR), (ii) alkali soluble emulsion thickeners (ASE), or (iii) mixtures thereof. HASE and ASE thickeners are preferred. To provide for easy mixing on the jobsite, the thickener must rapidly dissolve in the aqueous phase of the water-based coating. HASE and ASE thickeners meet this requirement. Rapid dissolution of thickener in water-based coating is further facilitated if the thickener is soluble in the organic solvent.

An exemplary weight percentage of thickener in the aqueous phase of the coating, where the first component comprising the acrylic emulsion does not contain HASE, HEUR, or ASE type thickeners is 0.25% to 3.0% (by dry weight). More preferred weight percentage of thickener in the aqueous phase of the coating is 0.5% to 2.0%. Most preferred weight percentage of thickener in the aqueous phase of the coating is 0.75% to 1.5%. However, if the first component comprising the acrylic emulsion does contain one or more of the HASE, HEUR, and/or HASE thickeners as the optional thickener, then the (dry) weight percentage of the thickener could be about one percent higher.

The foregoing description of exemplary embodiments and ranges is intended to provide sufficient direction to the skilled artisan for application of components in accordance with the present invention, wherein range amounts can be adjusted by the artisan in accordance with situational requirements. For example, a preferred method of the invention for providing a liquid-applicable coating composition for creating a flame-retarding, water-vapor permeable air barrier membrane on a construction surface at low application temperatures, comprises: (A) mixing together a first component comprising a coating composition which is applicable as a water-based liquid and which provides a flame retardant, water-vapor permeable air barrier coating when dry, and a second component comprising a freezing point depressing agent, whereby a water-based liquid composition is obtained; said first component comprising on a dry solids basis (i) 30% to 50% of an acrylic polymer or copolymer having a glass transition temperature not higher than minus 20 degrees Celcius (−20° C.), (ii) 45% to 65% of an inorganic flame retardant (such as ATH), (iii) 0.25% to 2% of a dispersant, (iv) 1% to 5% of a pigment; (v) 0.5% to 3% of a swellable clay; and (vi) optionally at least one additional additive selected from thickener (e.g., a modified cellulosic thickener), filler, biocide, fungicide, antioxidant, UV absorber, or mixture thereof; said second component comprising a (vii) freezing point depressing agent where the preferred molality of the freezing point depressing agent in the aqueous phase of the combination of components 1 and 2 is preferably 1.65 moles/kg to 13.7 moles/kg, more preferably 2.75 moles/kg to 8.2 moles/kg, and most preferably 2.75 moles/kg to 5.5 moles/kg, and (viii) a thickener selected from the group consisting of associative thickeners, alkali soluble emulsion thickeners, or mixture thereof where the concentration of thickener in the aqueous phase of the combination of said first and second components is 0.25% to 3% by weight; and (B) applying onto a construction surface a coating of said water-based liquid composition obtained from mixing together said first and second components, and allowing said applied coating to dry, whereby a flame-retardant, water-vapor permeable air barrier membrane is provided.

While the invention is described herein using a limited number of embodiments, these specific embodiments are not intended to limit the scope of the invention as otherwise described and claimed herein. Modification and variations from the described embodiments exist. More specifically, the following examples are given as specific illustrations of various embodiments or comparative performance based on the claimed invention. It should be understood that the invention is not limited to the specific details set forth in the examples. All parts and percentages in the examples, as well as throughout this specification, are by percentage of mass unless otherwise specified.

Further, any range of numbers recited in the specification or claims, such as that representing a particular set of properties, units of measure, conditions, physical states or percentages, is intended to literally incorporate expressly herein by reference or otherwise, any number falling within such range, including any subset of numbers within any range so recited. For example, whenever a numerical range with a lower limit (hereinafter "RL") and an upper limit (hereinafter "RU") is disclosed, any number R falling within the range is specifically disclosed. In particular, the following numbers R within the range are specifically disclosed: R=RL+k*(RU−RL), where k is a variable ranging from 1% to 100% with a 1% increment, e.g., k is 1%, 2%, 3%, 4%, 5%, . . . 50%, 51%, 52%, . . . 95%, 96%, 97%, 98%, 99%, or 100%. Moreover, any numerical range represented by any two values of R, as calculated above, is also specifically disclosed.

EXAMPLE 1

Comparative Formulations and Testing

Testing was done to compare performance of a liquid-applied coating made in accordance with the present invention with one that omitted a significant ingredient in the second component. The formulations involve the first component (acrylic) with two different formulations for the second component (freezing point depressing agent), one following the present invention, the other not following the present invention:

Formulation for First Component (Acrylic-Based Coating Composition)

|  | dry wt % |
|---|---|
| Acrylic polymer: Vinyl acetate acrylic ester copolymer with a Tg of −30° C. | 38.0 |
| Clay (e.g., montmorillonite) | 2.0 |
| Pigment (Titanium dioxide) | 3.0 |
| Flame Retarding Agent (Alumina trihydrate) | 55.0 |
| Dispersant (e.g., hydrophilic copolymer) | 0.5 |
| Additives (e.g., Fungicide, biocide, defoamer, cellulosic thickener) | 1.5 |
| Total Dry Solids | 100.0 |

The weight percentage of water in the coating component alone for the formulation shown above is 30%. Mixtures of this component with the two different freezing point depressing agents as will be described below will have slightly different water levels by weight. However, the molality of freezing point depressing agents (ethanol alone for additive 1 below and ethanol, calcium ions, and nitrite ions for additive 2 below) is similar for both mixtures.

Formulation for Second Component (Freezing Point Depressing Agent)

Two freezing point depressing agent formulations are shown below. "Low Temperature Additive Number 1" is in accordance with the present invention; whereas "Low Temperature Additive Number 2" is in accordance with prior art teaching (e.g., U.S. Pat. No. 8,748,528):

Low Temperature Additive 1—(Present Invention)

| HASE thickener 30% solids | 13.33 |
|---|---|
| Ethanol | 86.66 |
|  | 99.99 |

Low Temperature Additive 2—(Prior Art)

| Calcium nitrite in water | 19.0 |
|---|---|
| NH$_4$OH | 2.3 |
| Ethanol | 44.9 |
| water | 33.79 |
|  | 100.0 |

Mixtures of water-based, flame retardant, water vapor permeable air barrier coating with both additive 1 and additive 2 were prepared such that the molar amounts of the freezing point depressing agents (ethanol) in the aqueous phase of the coating contributed by each low temperature additive were similar. 100 wet (water included) parts of the water-based, flame retardant, water vapor permeable air barrier coating composition were blended with 7.5 parts of low temperature additive 1. The molality of ethanol in the aqueous phase was 4.8 moles ethanol per kilogram of water (solvent). 100 parts wet (water included) of the water-based, flame retardant, water vapor permeable air barrier coating was blended with 8.88 parts of low temperature additive 2. With additive number 1, the only solute is ethanol. For additive number 2, the solutes include ethanol, calcium ions, and nitrite ions. The combined molality of ethanol, calcium ions, and nitrite ions was 5.3 moles per kilogram water.

Closed containers of both mixtures were placed in freezers at −6.7 C (20 Fahrenheit) and −9.5° C. (15° F.) and left for one day. None of the mixtures froze. 70 mil sheets of the 4 chilled formulations were then cast onto gypsum board (exterior grade) at the temperatures mentioned above. The 4 specimens were allowed to dry for 4 days at these low temperatures. After one day, the sheets of coatings comprising additive 2 had frozen. Large spherulites were observed to be present on the surface of the sheets of coatings at both temperatures. However, both coatings made with additive 1 did not freeze. Both coatings made with additive 1 were seen to exhibit good film formation. The low temperature additive 1 according to the present invention provided adequate film formation at lower temperature; whereas coatings made using the low temperature additive 2 of the PRIOR ART (e.g., U.S. Pat. No. 8,748,528) did not.

EXAMPLE 2

Further Comparative Testing—Tensile Strength and Elongation

Tensile strength and elongation were also measured for coatings prepared (i) without any additive, (ii) with additive 1 (Present Invention), and (iii) with additive 2 (Prior Art). Results are shown below. Tensile strength and elongation are comparable in the coating made from the formulations containing no additive and additive 1. Tensile strength is increased and elongation is significantly reduced for the coating made from formulation containing additive 2. A low elongation is undesirable for the air barrier coating since it is required to have good crack bridging properties. The additive of the present invention provides for higher elongation in coatings compared to coatings prepared using the additive of the PRIOR ART (e.g., U.S. Pat. No. 8,748,528). The results are shown in Table 1 below.

TABLE 1

|  | No additive | Additive 1 | Additive 2 |
|---|---|---|---|
| Tensile (psi) | 140 | 138 | 301 |
| elongation (%) | 350 | 404 | 157 |

These test results demonstrated a surprisingly advantageous effect when salt (as used in PRIOR ART additive 2) is replaced by associative thickener (in additive 1).

EXAMPLE 3

Further Comparative Testing—Sag Resistance

Further testing was done to confirm a surprising advantage by including the specific thickener in the second component. Ethanol alone as a freezing point depressing agent lowers viscosity such that sag resistance of the wet coating is inadequate. Sag resistance of the wet coating was compared for two different formulation sets. One formulation set comprised a mixture of 100 parts (wet) of the first component (containing the acrylic emulsion) and 7.5 parts of the second component containing the freezing point depressing agent and specific thickener (additive 1 of present invention). The second formulation set comprised a mixture of 100 parts (wet) of the first component (containing the acrylic emulsion) and 6.5 parts of ethanol. Both formulation sets were spray-applied at 80 mils wet layer thickness onto an exterior gypsum board in a vertical position at 25° F. The coating comprising low temperature additive 1 had excellent sag resistance. In contrast, large areas of the coating comprising 6.5 parts of ethanol alone were observed to slide several feet down the vertical surface.

The principles, preferred embodiments, and modes of operation of the present invention have been described in the foregoing specification. The invention which is intended to be protected herein, however, is not to be construed as limited to the particular forms disclosed, since these are to be regarded as illustrative rather than restrictive. Skilled artisans can make variations and changes without departing from the spirit of the invention.

It is claimed:

1. A method for providing a liquid-applicable coating composition for creating a flame-retarding, water-vapor permeable air barrier membrane on a construction surface at low application temperatures, comprising:
   (A) mixing together a first component comprising a coating composition which is applicable as a water-based liquid and which provides a flame retardant, water-vapor permeable air barrier coating when dry, and a second component comprising a freezing point depressing agent, whereby a water-based liquid coating composition is obtained for coating the construction surface;
   said first component comprising (i) an emulsion of an acrylic polymer or copolymer having a glass transition temperature not higher than minus twenty degrees Celsius (−20° C.) and water, (ii) a flame retardant, (iii) 0.2% to 1% on a dry solids basis of a hydrophobic copolymer or polyacid homopolymer dispersant, (iv) a pigment, and (v) a swellable clay;
   said second component comprising (vi) the freezing point depressing agent which is an organic solvent; and (vii) a thickener comprising at least one of a hydrophobically modified alkali soluble emulsion (HASE), a hydrophobically modified ethylene oxide-based urethane (HEUR), or an alkali soluble emulsion (ASE), or a mixture thereof;
   wherein the first and second components are devoid or substantially devoid of alkali or alkaline earth metal salts chosen from chlorides, nitrates, or nitrites; and
   (B) applying onto a construction surface a coating of said water-based liquid composition obtained from mixing said first and second components, and allowing said applied coating to dry, whereby a flame-retardant, water-vapor permeable air barrier membrane is provided on the construction surface.

2. The method of claim 1, whereby said glass transition temperature of said acrylic polymer or copolymer provides film forming at minus 5° C. or lower without the presence of a coalescing agent.

3. The method of claim 2, wherein said first component comprises an acrylic copolymer comprising an acrylic ester and a comonomer.

4. The method of claim 3, wherein said comonomer is selected from the group consisting of vinyl acetate and acrylonitrile.

5. The method of claim 1, wherein said acrylic is a homopolymer or copolymer of an acrylic ester and has a repeating unit represented by the structure ($CH_2$—$C(R^1)$ HCOOR)— wherein R represents an alkyl group and $R^1$ represents hydrogen or $CH_3$-group.

6. The method of claim 5, wherein the acrylic ester is selected from the group consisting of ethyl acrylate, butyl acrylate, 2-ethylhexyl acrylate, isobutyl acrylate, octadecyl methacrylate, and octyl methacrylate.

7. The method of claim 1, wherein said first component comprises a flame retardant selected from the group consisting of mineral flame retardants, organo halogen compound flame retardants, and organo phosphorus flame retardants.

8. The method of claim 7, wherein said first component comprises a flame retardant comprising at least one of alumina trihydrate or chlorinated paraffin, or a mixture thereof.

9. The method of claim 1, wherein the first component comprises a dispersant comprising at least one of polyacid homopolymer or hydrophilic copolymer, or a mixture thereof.

10. The method of claim 1, wherein the swellable clay comprises at least one of montmorillonite, smectite, or bentonite, or is a mixture thereof.

11. The method of claim 1, wherein the first component further comprises at least one additional additive selected from the group consisting of a thickener, a filler, a biocide, a fungicide, an antioxidant, and an UV absorber.

12. The method of claim 11, wherein the first component comprises the additional thickener and said thickener is a modified cellulose thickener.

13. The method of claim 11, wherein the first component comprises at least one of the additional thickener and at least one of the additional filler.

14. The method of claim 1, wherein said organic solvent is selected from the group consisting of methanol, ethanol, propanol, isopropanol, methyl ethyl ketone, and acetone.

15. The method of claim 14, wherein the organic solvent is ethanol.

16. The method of claim 1, wherein the amount of organic solvent has a molality based on the aqueous content of the first and second components, when combined, of 2.75 moles/kg to 13.7 moles/kg, wherein moles/kg denotes moles organic solvent per kilogram of water.

17. A water-impermeable, vapor permeable barrier membrane, formed by the coating provided by the method of claim 1.

18. A barrier membrane-protected construction surface, provided by the method of claim 1.

19. A liquid membrane composition system comprising:
   a first component comprising (i) an emulsion of an acrylic polymer or copolymer having a glass transition temperature not higher than minus twenty degrees Celsius (−20° C.) and water, (ii) a flame retardant, (iii) a dispersant, (iv) a pigment, and; (v) a swellable clay; and
   a second component comprising (vi) a freezing point depressing agent which is an organic solvent; and (vii) a thickener comprising at least one of a hydrophobically modified alkali soluble emulsion (HASE), a hydrophobically modified ethylene oxide-based urethane (HEUR), or an alkali soluble emulsion (ASE), or a mixture thereof;
   said first and second components being provided separately for mixing together before application at a job site, and said first and second components being devoid or substantially devoid of alkali or alkaline earth metal salts chosen from chlorides, nitrates, or nitrites.

20. The liquid membrane composition system of claim 19, wherein the amount of organic solvent has a molality based on the aqueous content of the first and second components, when combined, of 1.65 moles/kg to 13.7 moles/kg, wherein moles/kg denotes moles organic solvent per kilogram of water.

\* \* \* \* \*